United States Patent [19]

Smith et al.

[11] Patent Number: 4,843,576
[45] Date of Patent: Jun. 27, 1989

[54] TEMPERATURE CONTROL ARRANGEMENT FOR AN EXTRUDING PROCESS

[75] Inventors: William J. Smith, Verona; Jin Takayama, Cheswick; Frank J. Varisco, Norristown; Jeffery J. Williams, Spring City, all of Pa.

[73] Assignee: Westinghouse Electric Corp., Pittsburgh, Pa.

[21] Appl. No.: 38,371

[22] Filed: Apr. 15, 1987

[51] Int. Cl.$^4$ .................. G06G 7/30; F25B 29/00
[52] U.S. Cl. .................. 364/557; 364/477; 264/40.6; 165/30; 165/14; 72/13; 366/145; 425/144
[58] Field of Search .................. 264/406; 366/145; 425/144; 165/14, 30; 364/477, 557; 236/15 BB; 72/13

[56] References Cited

U.S. PATENT DOCUMENTS

Re. 32,270 10/1986 Murray .
3,161,560 12/1964 Mosher et al. .
3,437,325 4/1969 Putman .
4,168,290 9/1979 Giles .................. 264/40.6
4,222,973 9/1980 Hill et al. .
4,674,027 6/1987 Beckey .................. 364/557

Primary Examiner—Thomas H. Tarcza
Assistant Examiner—David Cain
Attorney, Agent, or Firm—G. E. Hawranko

[57] ABSTRACT

An arrangement for controlling the process temperature in an industrial process involving an extruding operation includes a summing element which sums the difference between the process temperature and a setpoint temperature with the rate of change of the process temperature and conveys this sum to a proportional and integral controller so that the output thereof acts in an inverse manner with the process temperature. This output of the controller is summed with the change of temperature rate which has been fed forward, to generate a demand signal. The demand signal is shaped and compared to a ramp waveform to generate a variable frequencey pulse for controlling a heating and/or cooling device associated with the extruding device. A change of speed rate can also be summed to form the demand signal.

14 Claims, 2 Drawing Sheets

TEMPERATURE CONTROL ARRANGEMENT FOR AN EXTRUDING PROCESS

BACKGROUND OF THE INVENTION

1 Field of the Invention

This invention relates to an arrangement for controlling the temperature performance characteristics in a manufacturing process. More particularly, this invention relates to an enhancement in a temperature control system by use of a variable frequency pulse generation technique, this temperature control system being used in conjunction with an extruder process for extruding a plastic or other type of coating substance onto a material to be coated as for instance, a paper material.

2 Description of the Prior Art

For automated industrial processes in use today, particularly in systems where it is necessary to maintain predictable operating performances over a large enough time frame so as to greatly reduce or even eliminate system downtime and product waste, precise control over the operating parameters of the devices which actually perform the manufacturing operation, has been accomplished using complex distributive processing techniques. One such distributive processing system has been effectively utilized in a material coating operation such as for instance, a plastic film coating operation for a paper mill system wherein it is necessary to maintain the operating temperature of the extruder barrel to a precise degree so as to insure that the proper thickness of plastic film is dispersed onto the paper product at all times. It can be appreciated that a temperature control apparatus for an extruding process has widespread applicability in other areas besides the above example and that this invention is intended to cover those areas as well, an example of which can be a rubber coating operation. Furthermore, a temperature control apparatus such as is disclosed herein, can be used in other industrial process applications as well, an example of which can be found in U.S. Pat. No. 3,437,325 issued to R. E. Putman, Jr. on Apr. 8, 1969 which is directed to an arrangement for balancing the heat control in a rotary kiln.

One paper coating industrial operation using an extrusion process is disclosed in U.S. Pat. No. 3,161,560 issued on Dec. 15, 1964 to Owen D. Mosher et al. Another industrial operation involving the application of a polyethylene film to a paper product, found in U.S. Pat. No. 4,222,973 issued to John A. Hill et al. on Sept. 16, 1980, illustrates the importance of maintaining the extrusion melt temperature to within a predetermined range. Yet another application of a paper coating operation that recognizes the significance of the extrusion melt temperature in maintaining the thickness of the extrusion coating to within a predetermined dimension is found in U.S. Reissue Pat. No. RE-32270 which was reissued to Lee J. Murray, Jr. on Oct. 28, 1986.

The extruding process associated with the coating of the paper material must be controlled so that the thickness of the coating material is uniform over the entire length of the paper product and for all phases of operation of the paper processing operation whether during system start-up, everyday production, or shut-down of the system. In this particular application, a sheet of the paper product passes beneath an extruder barrel which can have associated therewith, a number of zones each of which can be controlled as to the amount of coating material dispersed therethrough. Each zone must be controlled in the similar manner so that the overall coating operation is uniform.

Certain factors establish the flow of coating material through the extruder barrel, the two primary factors of which are the speed of the screw disposed within the extruder barrel to perform the function of extruding the coating material, and the other of which is the temperature of the extruder barrel which, in dealing with a plastic coating material, is of inherent importance. To illustrate this importance, it has been found that one problem encountered in the start-up operation of the paper coating process has been that an overshoot of the process temperature of the extruder barrel has caused either an excess or a deficiency in the amount of coating material to be dispersed onto the paper product thus ruining that production run. Temperature overshoot can be characterized as a damped oscillation condition and is defined as that condition which occurs when the selected temperature setting is not immediately achieved; that is, the actual process temperature varies about the setpoint temperature for a period of time before it settles into the selected setpoint temperature. It is understood that the problem of temperature overshoot is not limited to the start-up sequence, but can occur at any time it is desired to change the extruder through-put which is the amount of coating material extruded through the extruder barrel. It is further required that the temperature control apparatus for the extruder process be effective for controlling this temperature overshoot problem for all screw speeds.

Another problem encountered in existing extruding processes associated with a paper coating manufacturing operation comes about as a result of a temperature sag that occurs during an increase in extruder through-put. It is known that the practice of increasing extruder through-put is accomplished by increasing the extruder screw speed and that at this time the temperature of the extruder barrel which has been previously selected to accommodate a specific amount of coating material, cannot maintain the setpoint temperature for the increased volume. It is therefore required that a temperature control apparatus for an extruding process compensate for this temperature sag during periods of increasing extruder through-put so that the coating material thickness can be maintained to the preselected dimension.

Inherent in the control of the operating temperature of the extruding process is the control of the heating and/or cooling devices which are disposed in proximate relation to the extruder barrel. Altlhough the present temperature control system has been described in conjunction with a distributive processing system which may be used to control an entire production facility, it is a further requirement of the present invention that the temperature control apparatus be operable in a situation where the extruder process is implemented using a standard electrical hardware configuration. For this type of configuration, the output signal of the temperature control apparatus must be compatible with the operation of the heating and cooling devices.

SUMMARY OF THE INVENTION

It is therefore an object of the present invention to provide a temperature control apparatus for a manufacturing operation utilizing an extruding process which minimizes temperature overshoot and temperature sag associated with the extruder elements for all operating phases of the manufacturing process.

According to the principles of the present invention, there is provided a means for extruding a coating material onto a surface, a means for determining a rate of change in a process temperature associated with the extruding means, a means for comparing this process temperature with a preselected set point temperature and generating a difference signal commensurate therewith, a means for summing the difference signal and the output of the rate determining means associated with the process temperature and developing a control signal as a result of this summation, a means for generating a demand signal as a function of the control signal and the output of the rate determining means, a function generator receptive of the demand signal and effective such that the demand signal is shaped into a functional waveform depending on the magnitude of the demand signal, and a means for comparing the functional waveform output of the function generator to a predetermined waveshape and outputting a variable frequency pulse as a function of such comparison, such variable frequency pulse being effective such that the operating temperature is controlled thereby.

DESCRIPTION AND OPERATION

Figure 1:
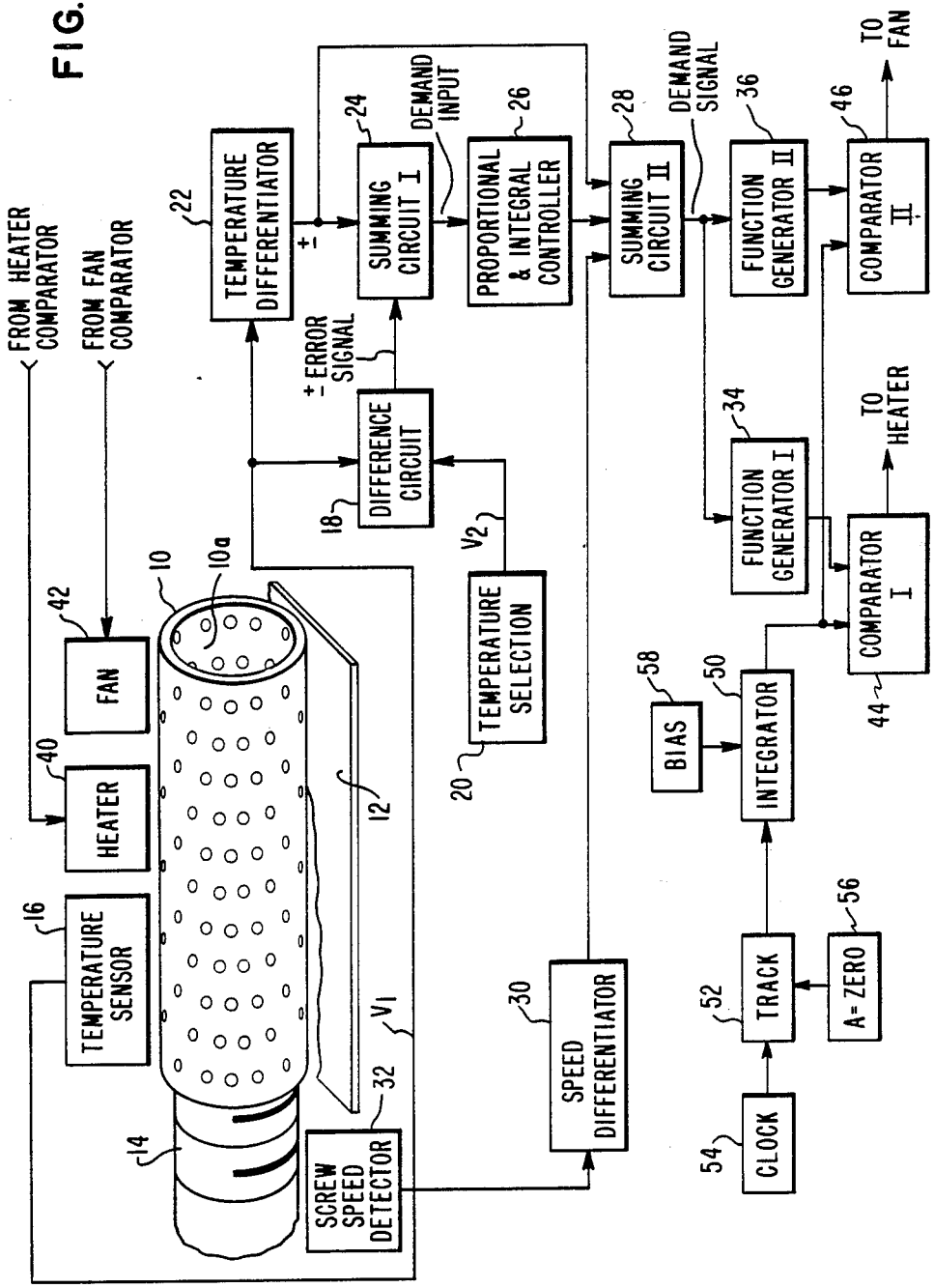
FIG. 1 is a diagrammatical view in functional block form of a temperature control arrangement for an extruder process constructed in accordance with the present invention.

As seen in FIG. 1, the temperature control arrangement for an extruding process associated with a manufacturing operation designed for dispersing a plastic coating onto a paper product is shown in block diagram form and includes an extruder barrel 10 having formed along the cylindrical surface thereof, a plurality of openings 10a and a die (not shown) through which the plastic coating material is extruded onto the surface of the paper product designated in FIG. 1 as reference 12. It will be noted that FIG. 1 is representative of a single zone of the extruder barrel and that, in practice, the extruder process will include a number of zones each of which must be controlled in the same manner. Disposed within the extruder barrel 10 is the extruder screw 14 which, by being rotated at a specific speed and assuming at this time that the extruder process temperature is at the selected value, controls the flow of the plastic coating material through the extruder openings 10a so that, as the paper material 12 passes thereby, the exact thickness of coating material is administered to the paper surface. For purposes of this disclosure, it is assumed that the speed control arrangement for the extruder screw 14 is of a known configuration and need only be discussed in general terms. Additionally, it is assumed that the manner of supplying the plastic coating material through the threads of the extruder screw 14 and to the inner surface of the extruder barrel 10 is well known to those skilled in the art.

In association with the speed of the extruder screw 14, the temperature of the extruder barrel 10 is also determinative of the flow of coating material through the extruder openings 10a. This is especially true during start-up of the production facility at which time the process temperature of the extruder barrel 10 has not been stabilized to the setpoint temperature. In order to insure the proper flow of coating material onto the paper product surface, the speed of the extruder screw 14 must be coordinated with the viscosity of the coating material, and to this end, the stabilization of the process temperature of the extruder barrel 10 is the controlling consideration.

The feedback arrangement for the temperature control apparatus shown in FIG. 1 includes a temperature sensing device 16 which is disposed in proximate relation to the extruder barrel 10 and which performs the functions of detecting the process temperature, hereinafter referred to as temperature T1, of the extruder barrel 10, and generating a voltage V1 representative of this temperature T1. Such a temperature sensing device 16 is in common use in control systems and can be accomplished using readily available commercial components.

This voltage V1 is connected in one direction to a difference element 18 which has as its second input, a voltage V2 which is representative of the setpoint temperature, the setpoint temperature being that temperature at which the process is intended to operate and which will hereinafter be referred to as temperature T2. The difference element 18 is another commercially available control system component and which has the functional property of providing an output voltage representing the difference between voltages V1 and V2. Since voltages V1 and V2 represent the process temperature and the setpoint temperature respectively, the difference therebetween represents the difference in the temperatures T1 and T2 and will hereinafter be referred to as the error signal.

The setpoint temperature T2 and voltage V2 associated therewith are derived from a temperature selecting element 20. For purposes of this invention, the temperature selecting element 20 will only be discussed in terms of the function that it serves; that is, the temperature selecting element 20 provides the voltge V2 representing the preselected setpoint temperature T2 at which point the extrusion barrel 10 must operate to insure the proper dispersion of the coating material onto the surface of the paper product 12. This function can be provided by way of various different known techniques, the most common of which is the use of a distributive processing arrangement wherein a processor or group of processors analyzes all of the parameters of the industrial paper processing operation and generates the necessary commands to maintain this operation to within the performance specifications set out for the entire system. An example of a distributive processing arrangement can be found in the commercialized line of Westinghouse products designated as the Westinghouse Distributive Processing Family control system and generally referred to as the WDPF control system. It can be appreciated however that this function can also be accomplished using other processing arrangements such as can be achieved using a desktop computer or even using a discrete hardware logic circuit arrangement which can have a manual temperature selecting arrangement associated therewith.

In addition to being electrically coupled to the difference circuit 18, the voltage V1 representing the process temperature T1 is also coupled to a first differentiator 22 hereinafter referred to as the temperature differentiator 22. The temperature differentiator 22 is effective for generating a voltage signal representing the rate of change of the process temperature T1 with respect to time. This temperature rate signal can have a positive or a negative sign associated therewith depending of whether the change in process temperature is an increasing or a decreasing one. Additionally, the temperature differentiator 22 is configured so as to place an upper and a lower limit on the temperature rate signal. As with the difference circuit 18 and the temperature sensing element 16, the temperature differentiator 22 is a readily, commercially available control system component and can be found in typical process control systems.

The temperature rate signal which will be designated RS1 and the error signal which will be designated ES1 are coupled to the inputs of a first summing element 24 which is effective for summing these two signals and generating a demand input signal as a result thereof. It will be noted that both the temperature rate signal RS1 and the error signal ES1 can assume either a positive or a negative value and that the first summing element 24 can accommodate this relationship and generate the demand input signal accordingly.

The demand input signal is coupled to the input of a proportional and integral controller 26 hereinafter referred to as a PI controller for which it is known in the art that this element can be provided by an amplifier (not shown) having resistive and capacitive elements (not shown) associated therewith. This PI controller 26 arrangement exhibits a transfer function having an integrator portion effective for integrating the demand input signal as a result of the 1/S operator contributed by the capacitive element and a proportional portion effective for providing a constant output signal value and which is achieved as a function of the resistive element and the gain factor of the amplifier (not shown). It will be observed that by providing a path from the temperature differentiator 22 to the PI controller 26, through the first summing circuit 24, the demand input signal will include a rate factor which has the effect of causing the output of the PI controller 26 to vary inversely with the rate of change of the process temperature T1. This relationship can be illustrated by an example whereby it is assumed that the process system is first started up and the process temperature T1 is rising to the desired setpoint temperature in the manner of a damped oscillation waveform having associated therewith a degree of overshoot. Under this assumption, the derivative of this waveform which is the temperature rate signal RS1 and the error signal ES1 are summed by the first summing circuit 24 with the resultant waveform having a generally decreasing value as the process temperature T1 approaches the setpoint temperature T2 since the rate of change of the process temperature is also decreasing at this time. It is known that this is the time at which the PI controller 26 would be increasing since it is an integral operation which quantifies the area under the curve represented by the demand input signal.

The output of the PI controller 26, which provides the signal that acts inversely with the rate of change of the process temperature T1, is connected to one input of a second summing element 28. Connected to a second input of the second summing element 28 in a feed forward manner, is the temperature rate signal output from the temperature differentiator 22. The second summing element 28 is therefore effective for developing the demand signal which will eventually control the operation of the temperature control elements that are yet to be discussed.

Also connected to an input of the second summing element 28 is a second rate signal which is based on the rate of change in the speed of the extruder screw 14. This speed rate signal is effective for modifying the demand signal output from the second summing element 28. This modification accounts for the situation where the temperature of the extruder barrel 10 is not only controlled during system start-up and shutdown but also during the normal operating situation where the screw speed must be adjusted so that the extruder through-put can be adjusted.

The speed rate signal is provided by means of a speed differentiator control element 30. This speed differentiator 30 receives a voltage signal input which is proportionate to the speed of the extruder screw 14 and outputs the speed rate signal which is the derivative of this input signal. Associated with the speed differentiator 30 is a low limit setting which is set at zero and insures that the speed rate influence only acts during an increase in extruder screw speed. A screw speed detecting element 32 generates the voltage representing the screw speed, using conventional methods, as for instance, by use of an optical source and sensing arrangement or by use of a tachometer device (not shown).

The output of the second summing element 28, which has been designated the demand signal, can in practice accomplish temperature controlling actions for two distinct situations by utilization of the two different rate signals. The first situation is the previously discussed temperature overshoot situation which can occur at system start-up and for which the temperature rate signal is instrumental in reducing this overshoot. The second situation occurs during periods where it is desired to increase the extruder through-put at which time a sag in the temperature of the extruder barrel 10 can occur. By conditioning the demand signal on the speed rate signal as well, the temperature sag associated with an increase in extruder through-put is minimized.

The demand signal output from the second summing element 28 is directed in two paths to two separate function generators 34 and 36 which are effective for shaping the demand signal into the distinct waveforms needed to individually control either a heating element 40 or a cooling element 42 or both. It will be noted that if only the heating element were provided with the extruder barrel 10, there would not be a need for two separate function generators. The function generators 34 and 36 shape the demand signal into two different waveshapes, one for controlling the heater element 40 and one for controlling the cooling element 42. The function generators 34 and 36 perform this shaping function depending on the magnitude of the signals input to and summed by the second summing element 28.

Figure 2A:
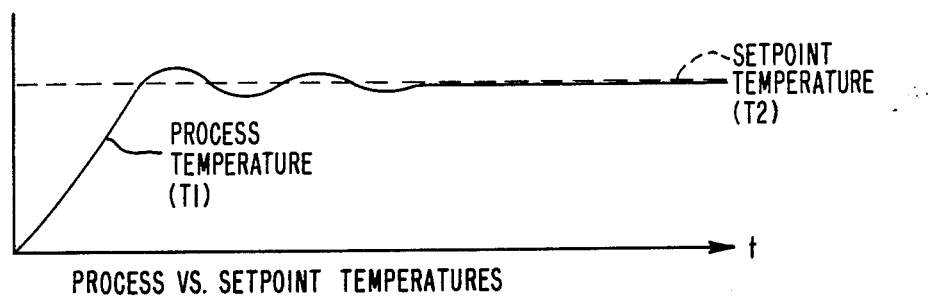
FIGS. 2A through 2D are graphical representations of the waveforms associated with the temperature control arranagement of FIG. 1.
Figure 2B:
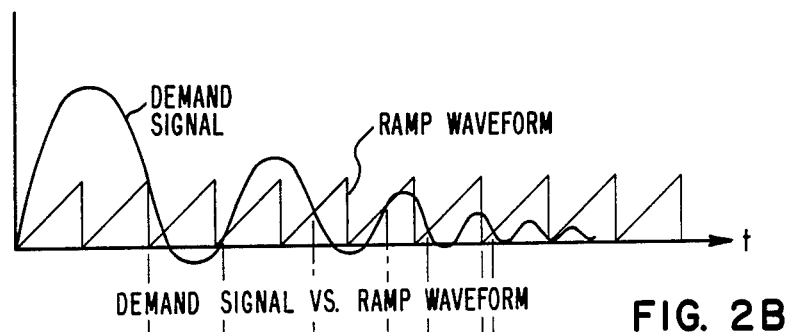

The shaped demand signals output from the respective first and second function generators 34 and 36 are individually connected to first inputs of separate high/low comparator elements 44 and 46. Connected as the reference input to the first and second comparator elements 44 and 46 is a ramp waveform having a preselected frequency and a preselected amplitude. The ramp waveform, which is shown in FIG. 2B, is generated by an integrator element 50. The integrator element 50 has connected thereto through a tracking element 52, a clock input generated by a clock element 54, and a gain factor generated by a gain element 56. A bias control element 58 is also connected to the integrator element 50. It is contemplated in this configuration for the generation of the ramp waveform that the clock input to the integrator element 50 be adjustable so that the frequency of the ramp waveform can be adjusted thereby.

Figure 2C:
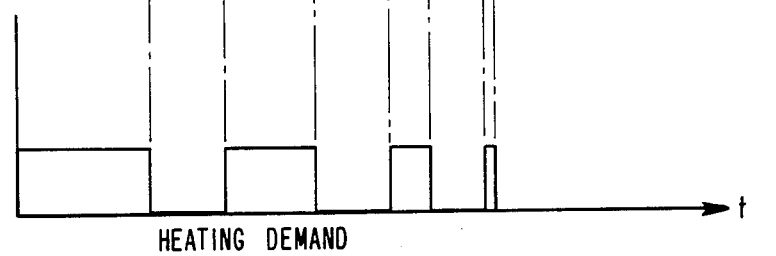

As seen in FIG. 2C, the output of the first comparator 44 is a pulse shaped waveform which has a variable frequency and pulse duration associated therewith which are determined as a function of the relationship between the shaped demand signal and the ramp waveform output from the integrator element 50. This variable frequency pulse is connected to the heater element 40 which is disposed in surrounding relation to the extruder barrel 10. The heater element 40 can be provided from any number of commercially available types an example of which could be a heater element made up of a heating coil which is energized and deenergized by the logic high portions of the variable frequency pulse. It will be noted that the waveform of FIG. 2C is one having a decreasing duration for the high portion of the pulse and a longer time between occurrences of the high portion. This type of waveform has the properties of smoothing the temperature transition; that is, the heating element 40 is turned on less frequently and for a shorter duration as the process temperature T1 approaches the setpoint temperature T2.

Figure 2D:
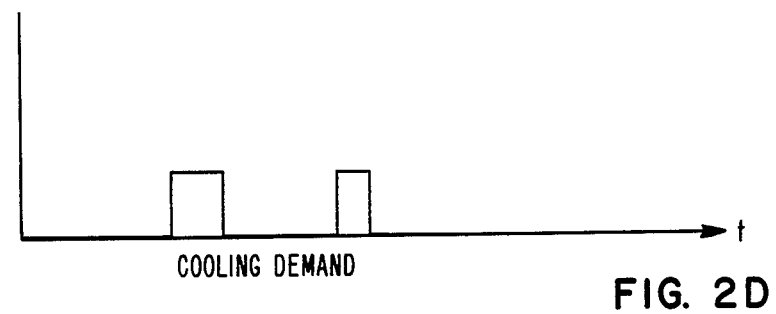

As seen in FIG. 2D, the control of the cooling element 42 is accomplished using the same principles as that used in the heating operation; that is, a variable frequency pulse is used to control the cooling element 42 to an on and off condition with the off condition being more prevalent as the process temperature T1 approaches the setpoint temperature T2 from the lower end. As with the heating element 40, the cooling element 42 can be provided from among a variety of commercially available components, an example of which can be a fan type of cooling arrangement. It should also be noted that the operation of the cooling element 42 occurs generally at times when the system has first been started up at which time the process temperature T1 will have a tendency to overshoot the setpoint temperature T2.

In operation the temperature control arrangement for an extruding process is effective for limiting the amount of temperature overshoot that occurs when the system is first started up by providing a feed forward feature of a temperature rate signal and by providing the same temperature rate signal as an input to a PI controller 26. By introducing the temperature rate signal as an input along with the process error signal to the PI controller 26, the output of the PI controller 26 will act inversely with the change in the process temperature T1. The output of the PI controller 26, when summed with the temperature rate signal which has been connected in a feed forward manner to the second summing element 28, yields the demand signal which can be illustrated by way of the waveform example shown in FIG. 2B wherein one particular demand signal is plotted in relation to ramp waveform.

As seen in FIG. 2B, the shaped demand signal is sinusoidal and is at its peak value when the process temperature T1 is approaching the setpoint temperature T2. Additionally, it can be seen that due to the influence of the temperature rate signal which is decreasing in magnitude as the process temperature T1 approaches the setpoint temperature T2, the demand signal is decreasing as well in a more timely manner than it would if just the process error signal were used to determine the magnitude of the demand input signal to the PI controller 26.

The generation of the heating and cooling demand waveforms shown in FIGS. 2C and 2D as pulses having a variable frequency and duration, is accomplished by comparing the shaped demand signals with the ramp waveform of FIG. 2B and outputting a logic high pulse each time that the shaped demand signal exceeds the ramp waveform reference signal. These variable frequency pulses are then connected to the respective heating and cooling elements 40 and 42 to effectively turn these elements on and off in sequence with the high and low pulse segments of the respective waveforms.

Although the above detailed embodiment constitutes a preferred embodiment of the invention, it can be appreciated that modifications can be made thereto without departing from the scope of the invention as detailed in the appended claims.

We claim:

1. A temperature control apparatus for use with a surface coating system, comprisiing:
   means for extruding a coating material onto said surface, said coating material being dispersed onto said surface to a thickness determined as a function of the operating temperature of said extruding means;
   means for determining a rate of change of said operating temperature;
   means for comparing said operating temperature to a set point temperature and outputting a difference signal representing the difference therebetween;
   means for summing said difference signal and said change of temperature rate such that a first sum results therefrom;
   means for developing a control signal as a function of said first sum, said control signal acting in a manner such that, as said change of temperature rate decreases during an overshoot condition, said control signal increases in magnitude thereby varying inversely with said operating temperature;
   means for generating a demand signal using at least said control signal and said change of temperature rate which has been fed forward from said determining means, said demand signal representing a summation of at least said change of temperature rate and said control signal which increases as said change of temperature rate decreases during such overshoot condition; and
   means for comparing said demand signal to a waveform of a predetermined shape and outputting a variable frequency pulse in relation to such comparison.

2. A temperature control apparatus as set forth in claim 1 further comprising a means for determining a rate of change in speed of an extruding element associated with said extruding means, said change of speed rate being input to said generating means such that said demand signal is generated as a function of said change of speed rate in addition to said control signal and said change of temperature rate, said demand signal thereby acting in a manner such that, during a temperature sag condition associated with an increase in the speed of said extruder element, said demand signal varies in direct relation to said change of speed rate.

3. A temperature control apparatus as set forth in claim 2 wherein said change in temperature rate is determined by a temperature differentiator element and said change of speed rate is determined by a speed differentiator element, said temperature differentiator element having associated therewith, a high and a low limit value which define a maximum and a minimum change of temperature rate determinable by said temperature control apparatus, and said speed differentiator having associated therewith, a low limit which establishes that only an increasing rate of speed change will be output from said speed differentiator element.

4. A temperature control apparatus as set forth in claim 1 wherein said extruding means includes an extruder barrel having formed along the outer periphery thereof, a plurality of extruder openings through which said coating material is extruded by rotation of an extruder screw element disposed at least partially within said extruder barrel, said extruder means further including a heating element disposed in proximate relation to said extruder barrel and operable to an on and off condition in sequence with said variable frequency pulse.

5. A temperature control apparatus as set forth in claim 1 wherein said predetermined waveform on which said comparing means is operative, is a ramp waveform having a predetermined frequency, said ramp waveform being generated by an integrator element receptive of a clock pulse input having a predetermined amplitude associated therewith.

6. A temperature control apparatus as set forth in claim 5 wherein said clock pulse is adjustable in frequency which effectively provides that said frequency of said ramp waveform is adjustable as a consequence thereof; said comparing means, which compares said demand signal to said ramp waveform according to the frequency of occurrence of the ramp portions of the ramp waveform, thereby providing an output that can be adjusted as a function of an adjustment of said clock input to said integrator element.

7. A temperature control apparatus as set forth in claim 1 further comprising a function generator receptive of said demand signal and effective such that a functional waveform is generated as a function of the magnitude of said demand signal, said functional waveform representing said demand signal being connected to said comparing means for comparison to said ramp waveform.

8. A temperature control apparatus as set forth in claim 1 wherein said developing means is a proportional and integral controller element receptive of the sum of said difference signal and said change of temperature rate and effective for developing at least a portion of said control signal by integrating said summation of said difference signal and said change of temperature rate.

9. A temperature control apparatus as set forth in claim 8 wherein said change of temperature rate is connected both to said summing means, the output of which is integrated by said proportional and integral controller and, in a feed-forward manner, to said means for generating said demand signal which sums said change of temperature rate with said control signal developed at least partially as a function of the integral of said change of temperature rate.

10. A temperature control apparatus as set forth in claim 4 further comprising a cooling element disposed in proximate relation to said extruder barrel and operative to an on and off condition in sequence with a second variable frequency pulse generated by a second means for comparing said demand signal to said waveform having a predetermined shape.

11. A method of controlling the process temperature for a device associated with an automated industrial process system, said temperature controlling method comprising:
   measuring a rate of change of said process temperature;
   comparing said process temperature with a setpoint temperature and outputting a difference signal as a result of said comparison;
   summing said change of temperature rate and said difference signal;
   driving a controller element with the output of said summing step such that said controller element produces a control signal which acts in a manner such that, as said change of temperature rate decreases during an overshoot condition, said control signal increases;
   generating a demand signal by summing said change of temperature rate and said control signal such that said demand signal represents a summation of at least said change of temperature rate and said control signal which increases as said change of temperature decreases during such overshoot condition; and
   comparing said demand signal with a ramp waveform and generating as a result thereof, a variable frequency pulse waveform which varies in frequency so as to produce a temperature compensating factor for use by said automated industrial process system.

12. A temperature controlling method as set forth in claim 11 further comprising measuring a change of speed rate associated with said device and summing said change of speed rate with said sum of the output of said controller element and said change of temperature rate and generating said demand signal thereby.

13. A temperature controlling method as set forth in claim 12 further comprising setting an upper and a lower limit on said change of temperature rate and a lower limit on said change of speed rate.

14. A temperature controlling method as set forth in claim 11 further comprising shaping said demand signal in a function generator such that a functional waveform representing said demand signal can be compared to said ramp waveform.

* * * * *